(12) United States Patent
Schön et al.

(10) Patent No.: US 6,520,019 B1
(45) Date of Patent: Feb. 18, 2003

(54) ULTRASOUND SENSOR

(75) Inventors: Uwe Schön, Neunkirchen (DE); Cornelius Peter, Bühl (DE); Frank Hacke, Steisslingen (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/673,550

(22) PCT Filed: Mar. 22, 1999

(86) PCT No.: PCT/DE99/00825

§ 371 (c)(1),
(2), (4) Date: Jan. 19, 2001

(87) PCT Pub. No.: WO99/53475

PCT Pub. Date: Oct. 21, 1999

(30) Foreign Application Priority Data

Apr. 14, 1998 (DE) .......................................... 198 16 456

(51) Int. Cl.⁷ .............................................. G01H 11/08
(52) U.S. Cl. ......................................... 73/632; 310/336
(58) Field of Search ................... 73/632, 644; 310/322, 310/324, 334, 336

(56) References Cited

U.S. PATENT DOCUMENTS 3,879,726 A  4/1975  Sweany ................... 340/384.6
4,703,656 A  11/1987 Bhardwaj .................... 73/644

FOREIGN PATENT DOCUMENTS

JP  63269887  4/1990

*Primary Examiner*—John E. Chapman
(74) *Attorney, Agent, or Firm*—Fay, Sharpe, Fagan, Minnich & McKee, LLP (57) ABSTRACT

The invention relates to an Ultrasound Sensor, especially for a vehicle and the passenger compartment thereof, comprising a can-shaped housing, a housing base, a housing closure and a sensor element arranged at the base inside the housing, and in the area of the housing closure there is arranged a contact device which is attachable, in locally fixed fashion, inside housing; the contact device presenting, in the direction of the longitudinal axis, a penetrating recess and being connected, in electrically conductive fashion, in at least one contact point with at least one electrode of the sensor element by means of thick-stranded wire. The invention also relates to a method for producing the Ultrasound Sensor.

20 Claims, 6 Drawing Sheets

ULTRASOUND SENSOR

BACKGROUND OF THE INVENTION

The subject invention is directed to the art of ultrasound sensors and their manufacture and, more particularly, to a manufacturing method and ultrasound sensor apparatus of the type particularly adapted for use in the passenger compartments of motor vehicle.

Ultrasound sensors of the type under consideration are commonly formed to include a cup-shaped housing defining an interior space and a base upon which a piezo element is glued or otherwise attached. Vibrations of the cup-shaped bottom or base of the housing are transferred directly to the piezo element. The electrodes of the piezo element extend from the base of the cup-shaped housing to the outside via soldered or welded electrically conductive wires or lines. The cup-shaped housing is typically sealed off by means of a pourable sealing compound, such as a synthetic resin or plastic material. The electrically conductive lines extend to the outside of the ultrasound sensor through the sealing compound and serve for connection between the piezo element at the base of the housing and associated external electronics. By theses means, it is possible to evaluate the vibration behavior of the piezo element including the characteristic power curve emitted from the piezo element.

One problem with piezo sensors of the type described above, however, is the need for tension relief in the electrically conductive wires. More particularly, since the cup-shaped housing member is sealed off by a pourable sealing compound, the electrically conductive lines extending from the piezo element to the outside of the cup-shaped housing become fixed in space within the housing by mechanical interaction with the surrounding sealing compound. The locking in place of the electric signal lines has an adverse effect on the sensitivity and accuracy in the representation of the recorded sound waves. Sensors constructed according to the above with electric signal lines extending through a sealing compound typically do not satisfy the requirements of greater sensitivity and accuracy in the representation of recorded sound waves.

It would be desirable, therefore, to provide an ultrasound sensor and method for manufacturing same which provides an improved recording of sound waves or ultrasound waves and uses a simple and cost-effective construction. It is further desirable to provide an ultrasound sensor and method for manufacturing same which converts sound waves or ultrasound waves into current response signals.

SUMMARY OF THE INVENTION

The subject invention provides an ultrasound sensor including a can-shaped housing, a sensor element arranged in the can-shaped housing, a contact device adapted for connection with the can-shaped housing, the contact device defining a central opening, and at least one electrically conductive wire connecting an electrode of the sensing element with a contact point on the contact device through the central opening.

In accordance with a further aspect of the invention, a method for manufacturing ultrasound sensors is provided and includes the steps of attaching a sensor element to the base of an outer housing, attaching a contact device onto a portion of the housing adapted to receive the contact device, and electrically connecting the contact device with the sensor element through a recess provided in the contact device using a thick-stranded electrically conductive wire.

As can be seen from the forgoing, a primary object of the invention is the provision of an improved ultrasound sensor which enables a thick flexible wire-bond connection between the electrode of a piezo element disposed within the sensor housing and a contact device. The contact device is fastened locally within the housing and includes a central aperture or opening for receiving the electrically conductive wire braid. Thereby, it is possible to assure a contact point at the piezo element which is reproducibly exactly defined in its position relative to the piezo element structure.

A further object of the invention is that the contact point beneficially has less mass in contrast to contact points in known prior art piezo elements. Accordingly, the present invention utilizes a pre-determined connection point between the conductive wire and the piezo element so that the lowest possible influence upon the vibrational behavior of the piezo element is attained. The pre-determined connection point between the electrically conductive wire and the piezo element is easily reproducible and can be employed as a contact point with high accuracy.

A further object of the invention is a reduction in the negative influence on the vibrational behavior of the piezo element due to the lower mass of the connection point relative to known contact methods practiced in the prior art ultrasound sensor technology. As a result of the thick flexible wire and connection point selection according to the invention, the lowest possible change in the mass effect, and thus in the vibrational behavior, of the piezo element is attained.

A yet further object of the invention is to ensure tension relief of the electrically conductive lines extending between the contact device and the piezo sensor element. More particularly, the ultrasound sensor construction provided in accordance with the present invention enables a device without the need of additional pourable sealing compound within the can-shaped housing. Thereby, tension relief of the electrically conductive lines extending between the piezo sensor element and the contact device is assured.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENTS

Referring now to the drawings wherein the showings are for the purposes of illustrating the preferred embodiments of the invention only and not for purposes of limiting same, the figures illustrate an ultrasound sensor formed in accordance with the present invention and method for making same, the sensor including a cup-shaped or can-shaped housing 1 including a housing base 3, and a housing jacket 5 shaped as a hollow cylinder. Preferably, the housing jacket 5 is can-shaped but may be formed in any other configuration as desired such as, for example, with straight or tapered walls having round or polygonal cross-sections which may have bottoms and/or lids extending in straight or oblique panes toward each other.

Figure 1:
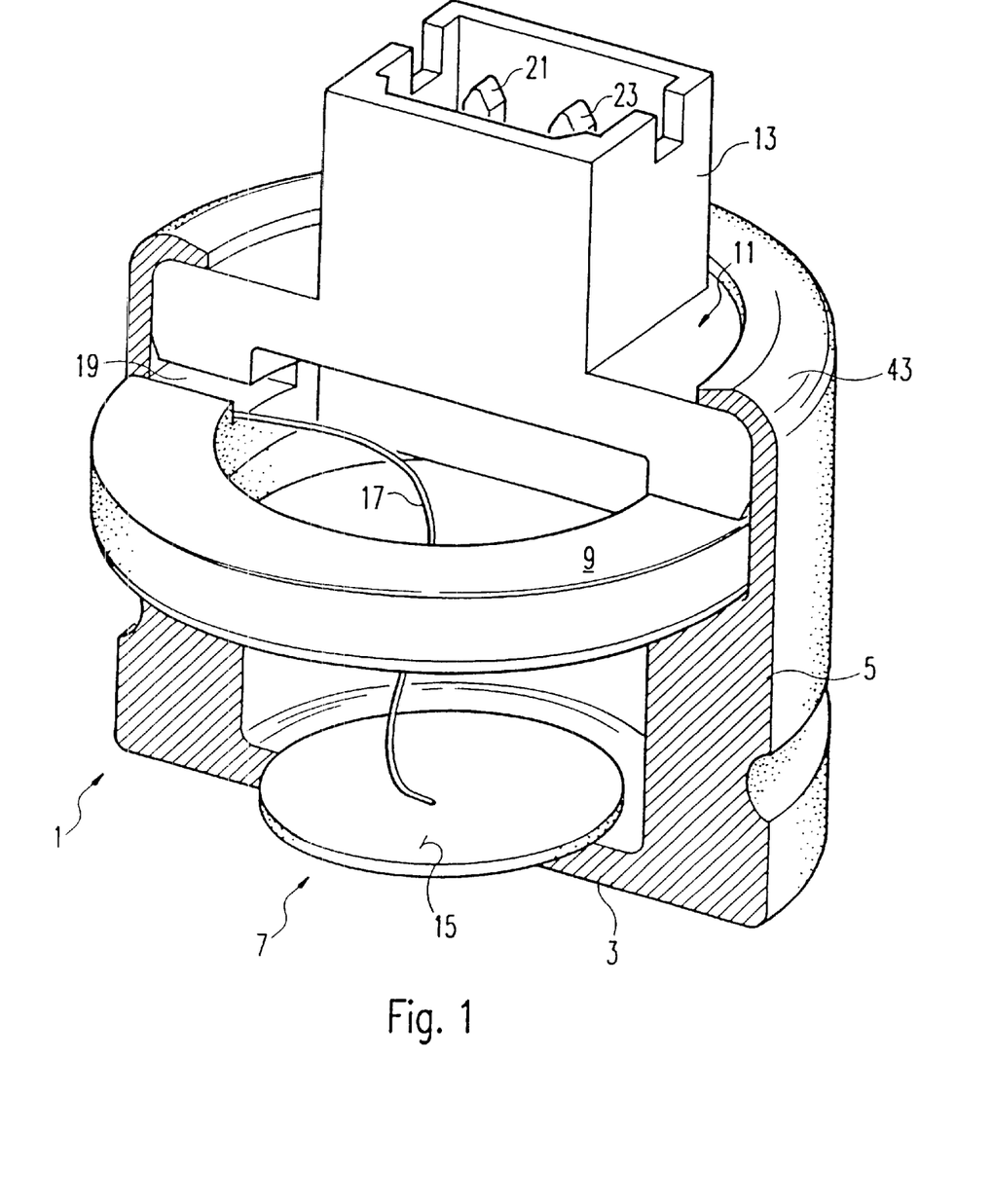
FIG. 1 is a perspective view in partial cross section of an ultrasound sensor formed in accordance with the present invention.
Figure 2:
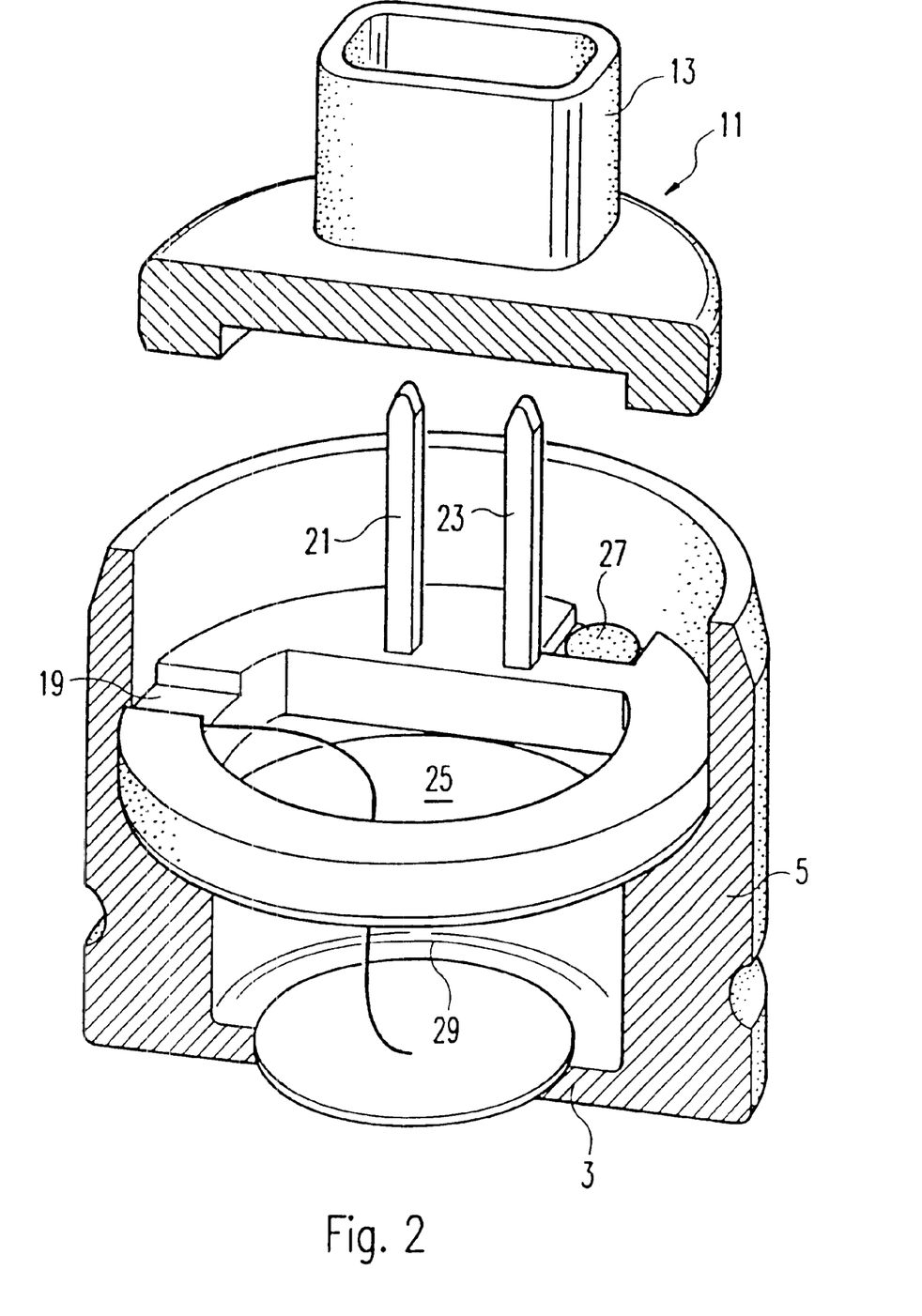
FIG. 2 is an exploded perspective view of the ultrasound sensor shown in FIG. 1 in partial cross section and in a partial state of disassembly before installation of the lid onto the housing jacket.

With particular reference to FIGS. 1 and 2, a sensor element 7 is attached at the interior bottom 3 of the housing 1 in a locally fixed and electrically conductive fashion. Preferably, the sensor element 7 is a piezo ceramic sensor element. A preferred sensor element 7 is of a plate condenser type construction in design and presents, therefore, at its underside, a lower electrode which is connected with the housing 1. The lower electrode of the sensor element 7 consists of an electrically conductive material such as, for example, aluminum. The upper side of the sensor element includes an upper electrode 15 arranged in parallel with the lower electrode (not shown) of the sensor in contact with the base of the housing. Although the disk-shaped sensor element shown in the FIGURES has a circular shape, other shapes such as, for example, oval, polygonal, or any other shape sensor can be used. Both the upper electrode 15 and the lower electrode (not shown) can be formed by a conductive layer applied by the piezo ceramics by a vacuum evaporation process for vacuum depositing silver, gold, or other materials.

Figure 6:
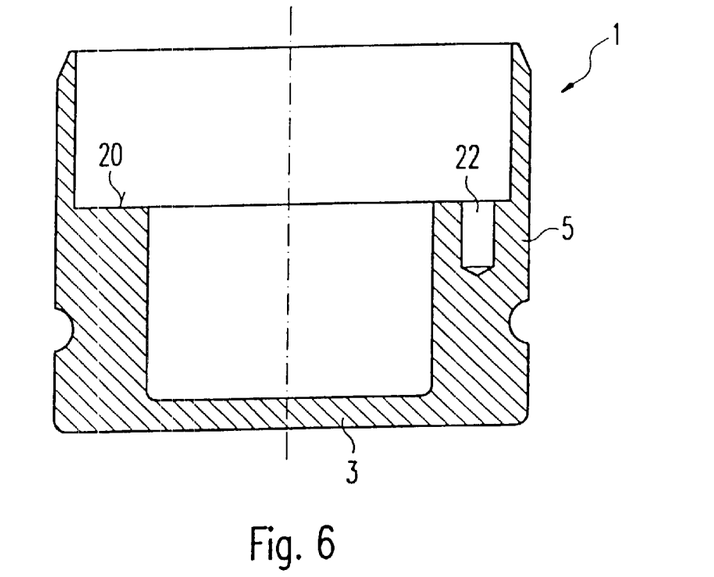
FIG. 6 is a cross sectional view of the ultrasound sensor housing jacket illustrated in FIGS. 1 and 2.

With continued reference to FIGS. 1 and 2, the upper electrode 15 is electrically joined with the contact surface 19 of a contact device by use of a thick-stranded flexible electrically conductive wire 17. As shown, the contact device 9 is arranged in the housing container in the area of the opposing closure. A lid 11 preferably in the form of a disk, is arranged above the contact device 9 as shown. The upper area of the housing jacket 5 forms a flange in response to a force actuated from above the housing jacket during the manufacturing process so that the flange formed by the housing jacket presses the contact device 9 against a straight shoulder 20 (FIG. 6) formed on the inner wall of the housing jacket. A plug receptacle area 13 is formed on the outer surface of the lid 11 for electrode connection of the ultrasound sensor to associated electronic devices. Preferably, the plug receptacle area 13 is formed as a connecting piece.

As can be seen, the plug receptacle area 13 has a generally rectangular layout (FIG. 1) with rounded-off corners (FIG. 2) and a height which is selected to adequately mechanically fix therein an insertable associated plug. It is to be appreciated, however, that the plug receptacle area 13 can also include a locking or counter-locking element which assures a mechanical connection within an inserted plug having a corresponding opposite internatable locking means.

Figure 7:
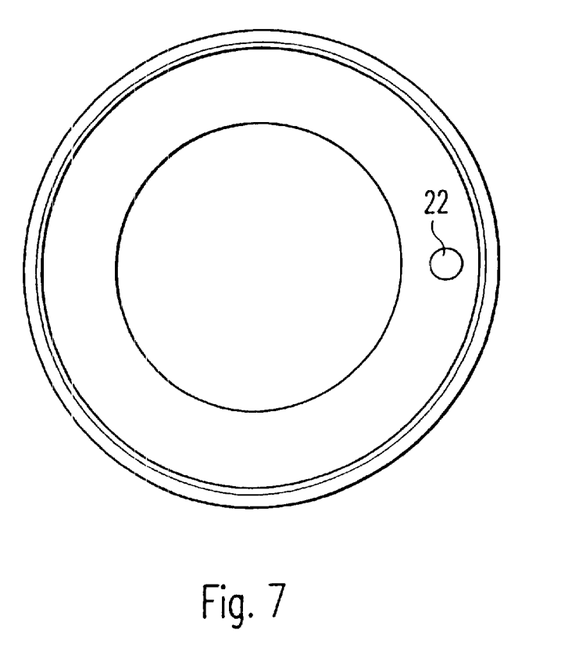
FIG. 7 is a top elevational view of the housing jacket shown in FIG. 6.

As shown in FIG. 1, the interior of the plug receptacle area 13 includes a longitudinally extending set of first and second contact pins 21, 23. The first and second contact pins 21, 23 form part of the contact device member 9 to be described below. As shown best in FIG. 2, the upwardly pointing contact pins 21 and 23 extend along the longitudinal axis of the housing and penetrate through the lid 11 in the area of the plug receptacle area 13 by means of a set of recesses formed to closely surround the outer surface of the contact pins. It is, however, also to be appreciated that the lid 11 could be formed to have a larger opening so that a portion of the contact 9 is received within the plug receptacle area 13, the portion of the contact device surrounding the contact pins 21 and 23 in this area. Further connection of the contact device 9 is provided in a marginal region of the contact device 9 by providing a round hole 37 (FIG. 5), which is in alignment with a recess 22 (FIGS. 6 and 7) in the shoulder of the housing jacket 5 and extending in a longitudinal direction A and formed as bore opening 22. As shown best in FIG. 2, the contact device 9 is connected with the housing jacket 5 in an electrically conductive fashion using a rivet 27. The rivet 27 extends into the recess 22 of the housing jacket 5 to mechanically and electrically connect the contact device 9 with the outer housing jacket 5.

Figure 3:
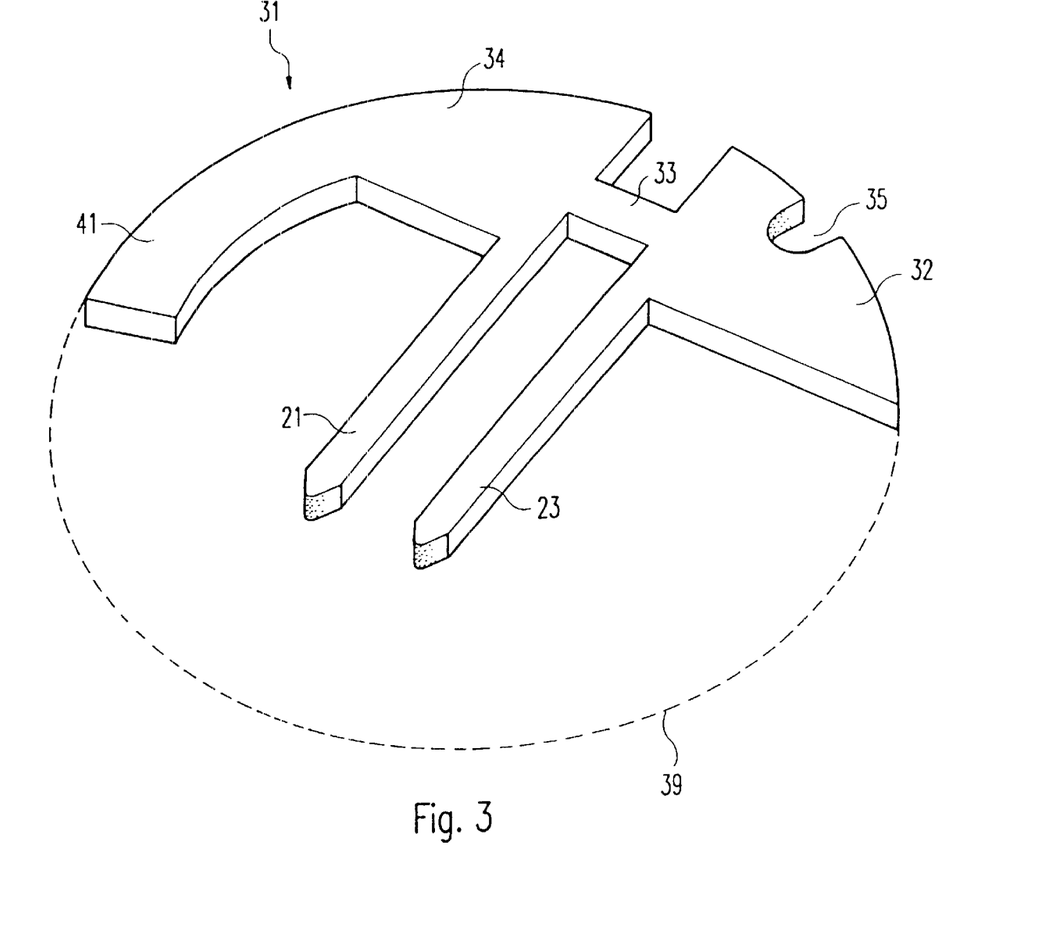
FIG. 3 is a perspective view of an electrically conductive pressed screen portion of a contact device used in the ultrasound sensor shown in FIGS. 1 and 2.
Figure 4:
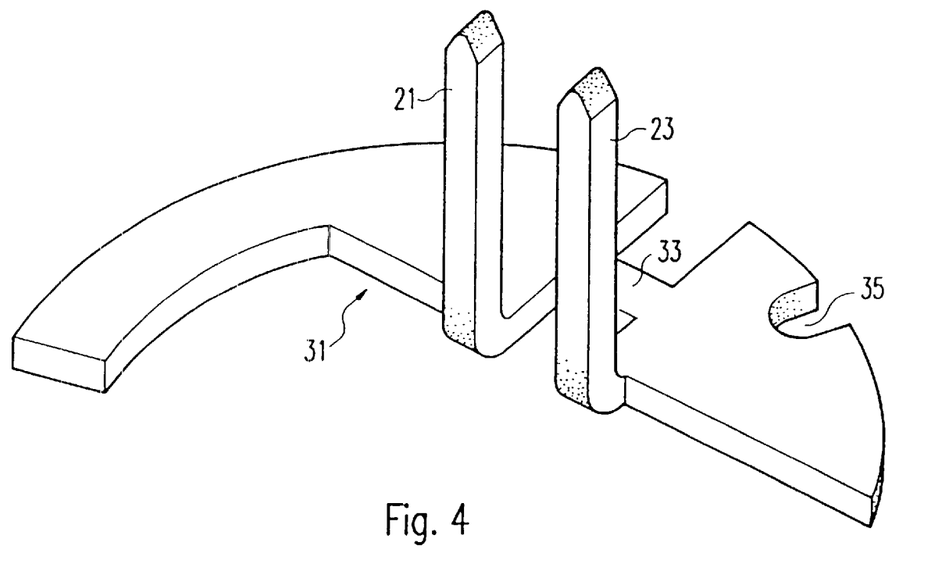
FIG. 4 is a perspective view of the pressed screen member shown in FIG. 3 subsequent to an initial manufacturing work step prior to assembly of the subject ultrasound sensor illustrated in FIGS. 1 and 2.
Figure 5:
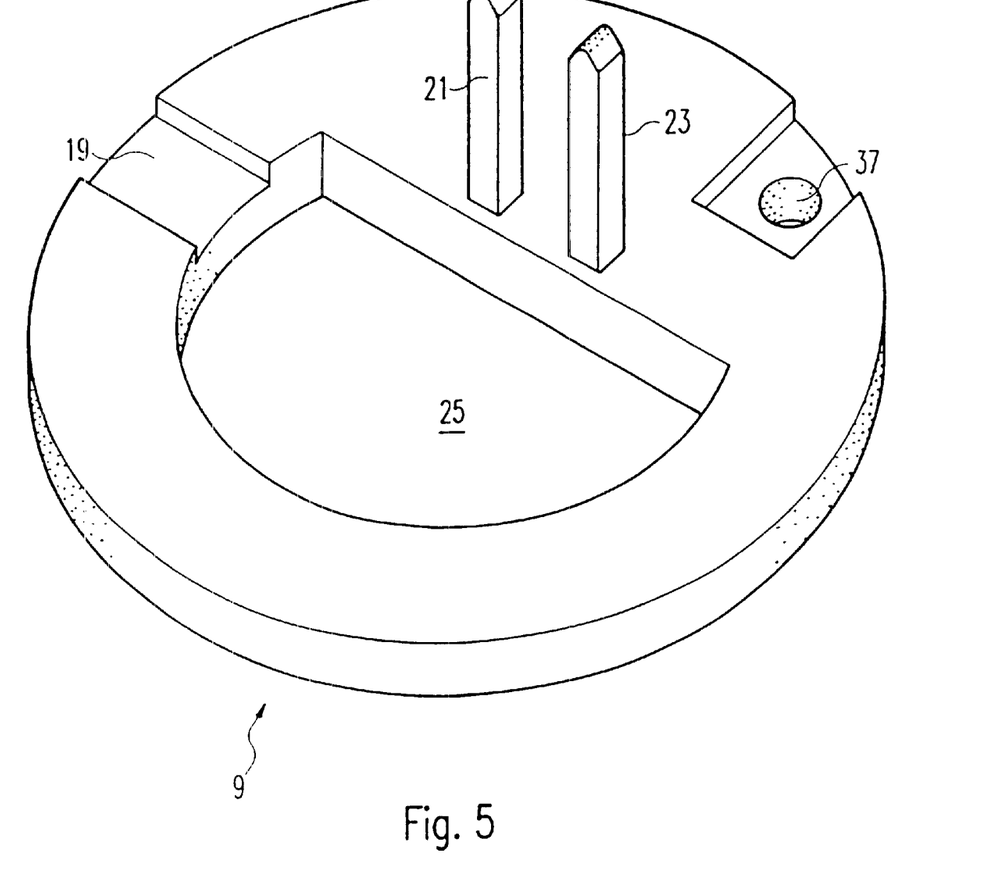
FIG. 5 is a perspective view of a contact device used in the ultrasound sensor of the present invention shown in FIGS. 1 and 2 and incorporating the pressed screen member shown in FIG. 4.

FIGS. 3–5 illustrate the preferred method of manufacturing the contact device 9 using individual components in sequential work steps. Turning first to FIG. 3, an electrically conductive pressed screen member 31 is provided. As shown, first and second contact pins 21, 23 are formed by the pressed screen 31 and arranged in a parallel relationship relative to each other. The contact pins are initially mechanically connected by means of a bridge portion 33 extending between opposite quarter circle segments 32, 34 of the pressed screen 31. As shown, the quarter circle segments 32, 34 are substantially in the shape of right-angled triangles. A U-shaped recess 35 is provided in the first quarter circle segment 32. As shown, the U-shaped recess is open in the direction of the circumference of an imaginary circle 39. A circular partial region 41 is arranged along the circumference of the circle 39 and connected with the second quarter circle segment 34.

FIG. 4 illustrates the pressed screen member 31 after the first and second contact pins 21, 23 are bent in accordance with an initial work step in the manufacture of the subject ultrasound sensor. As illustrated, the contact pins 21 and 23 are bent vertically in an upward direction from a plane defined by the pressed screen member 31. Preferably, as illustrated, the contact pins 21 and 23 extend in a direction substantially perpendicular with the plane defined by the pressed screen portion 31.

Next, in FIG. 5, a subsequent work step includes the pouring or a spraying of a synthetic material or synthetic resin onto the pressed screen member 31. The thus produced contact device 9 has a disk-shaped layout which is perforated by a central opening or a recess 25. Preferably, the recess 25 is outside of the region of the poured pressed screen 31. More particularly, the recess 25 provides a non-conductive path to the central opening of the contact device 9. The outer synthetic material or synthetic resin poured or sprayed on the electrically conductive pressed screen 31 isolates the pressed screen 31 from the opening 25. Preferably, the opening 25 has a half-moon or even three-quarter moon shape layout which is surrounded on its outer sides by an evenly thick circular ring. As shown, the straight edge portions of the half-moon recess basically correspond with the straight edge portions of the circular segments 32, 34 and by the straight lines facing the recess 25 and the poured sealing compound facing the same.

With continued reference to FIG. 5, it is to be noted that the contact device 9 includes a hole 37 defined therein in alignment with the recess 35 of the pressed screen member 31 shown in FIGS. 2 and 3. By using the round hole 37 described above, the contact device 9 is connected in an electrically conductive fashion by means of a rivet 27 which engages with the aligned recess 22 (FIG. 6) in the shoulder of the housing jacket 5.

Preferably during the manufacturing process, the bridge 33 in the contact device 9 is separated during the synthetic resin pouring process by means of a special tool so that the second contact pin 23 is connected solely with the circular segment 35 and the first contact pin 21 is connected solely with the circular segment 34 and the partial circular edge piece 41. In that way, the first and second contact pins 21, 23 in the circular segments 32 and 34, respectively, are both mechanically and electrically separated within the contact device 9 (FIG. 5). It is to be appreciated, however, that the separation of the bridge member 33 can also be performed before or after the synthetic resin pouring process.

With reference once again to FIG. 2, the lower electrode of the sensor element 7 is connected to the housing base 3 perferably using an electrically conductive glue. In that way, the lower electrode of the sensor element is connected with the circular segment 32 of the pressed screen member 31 in the region of the recess 35 through the housing bottom 3, the housing jacket 5, and the rivet 27. On the other hand, the first contact pin 21 is isolated relative to the housing 1 by means of the poured resin layer surrounding the pressed screen 31. The first contact pin 21 is electrically connected to only the circular segment 34 and to the circular partial edge 41. The top surface of the partial edge 41 forms a contact surface 19 best shown in FIGS. 1, 2, and 5. A thick-stranded flexible bond wire 17 (FIGS. 1 and 2) connects the upper electrodes of the sensor element 7 with the contact surface 19 and in turn to the first contact pin 21 through the circular partial region 41. Again, as noted above, the bridge portion 33 is separated to electrically isolate the first and second circular segments 32, 34 from each other and thereby separating the first and second contact pins 21, 23.

As shown in FIG. 2 an attenuator foam 29 is selectively positioned in the sensor housing 1 in the space between the bottom 3 and up to the shoulder member 20 or up to the contact device 9 positioned on the shoulder edge 20. The attenuator foam 29 is selected to modify the vibration behavior in the sensor in a pre-determined manner such as, for example, to provide increase broad-band or bandwidth, less after-vibration or increased dampening, and the like. Additionally, the attenuator foam contributes to the position stabilization of the braided bond wire 17 to reduce the risk of unwelcome tearing and/or breaking of the bond wire 17.

With reference once again to the preferred manufacturing method, subsequent to the formation of the contact device and gluing the sensor element 7 onto the bottom 3 of the housing 1, the contact device 9 is installed on a shoulder lip 20 on the interior side of the housing jacket 5 with the round hole or bore 37 of the contact device 9 aligned with the recess 22 provided in the shoulder of the housing. As noted, the sensor element 7 is glued on the bottom 3 of the housing using an electrically conductive specialty glue. Alternatively, it is possible to utilize a non-conductive glue such as, for example, an instant glue, whereby electrical contact is established, due to the roughness of at least one of the surfaces to be contacted via the tips or peaks of the rough surface which perforate the thin layer of glue. In any case, subsequently or simultaneously, the contact pin 23 of the contact device 9 is electrically connected with the housing 1 using a rivet 27. In that way, the contact pin 23 is electrically connected with the lower electrode of the sensor 7 via the circular segment 32, the rivet 27, the outer housing jacket 5 and the electrically conductive specialty glue.

In another manufacturing step, the contact surface 19 of the contact device 9 is bonded using a thick-stranded wire with the upper electrode 15 of the sensor element 7. The recess 25 or opening formed in the contact device 9 is advantageously used to enable the bond wire 17 to connect the upper electrode 15 in a first plane and with the contact surface 19 in a second plane. Overall, the bond wire 17 extends in a longitudinal direction between the plane of the contact surface 19 and the plane of the upper electrode 15.

After the upper electrode 15 is connected with the contact surface 19 using the bond wire 17, attenuation foam 29 is selectively added within the housing jacket 5 to exercise a desired effect on the vibrational characteristics of the ultrasound sensor. As noted above, the attentuation foam 29 is not necessary, but is used selectively when vibrational characteristics are to be controlled.

Next in the manufacturing process, the lid member 11 is inserted into the upper end of housing jacket 5 and, thereafter, an upper marginal area of the housing jacket 5 protruding above the lid 11 is bent downwardly by means of an associated crimping or a forming tool in the direction toward the center of the housing. In this manner, a flanging is created as best shown in FIG. 1. The flanging of the upper area of the housing jacket 5 mechanically secures the lid member 11 in contact with the contact device 9 which in turn rests on the shoulder 20 of the housing jacket 5.

As is apparent in FIG. 1, a plug receptacle 13 is formed in the upper region of the lid 11. The first and second electrical contact pins 21 and 23 extend from below and into a receptacle region of the plug 13. Thereby, the first and second contact pins 21, 23 can be selectively connected to associate electronic circuitry using a plug having similar mechanical characteristics.

It is to be appreciated that the preferred contact pins 21 and 23 described above and illustrated in the accompanying drawings can be formed as contact sockets without departing from the spirit and scope of the present invention. Additionally, the present invention contemplates a receptacle region 13 to be formed as a jack-type member, a plug-type member or as any other connection type.

The invention has been described with reference to the preferred embodiments. Obviously, modifications and alterations will occur to others upon a reading and understanding of this specification. It is intended to include all such modifications and alterations in so far as they come within the scope of appended claims or the equivalence thereof.

What is claimed is:

1. An ultrasound sensor comprising:
   a can-shaped housing including a housing base and a housing jacket defining a longitudinal axis A of the ultrasound sensor;
   a sensor element arranged inside the housing on the base thereof, the sensor element including at least one electrode;
   a contact device adapted for connection with the can-shaped housing, the contact device defining a recess penetrating the contact device in the direction of the longitudinal axis and defining at least one contact point; and,
   at least one electrically conductive wire connecting the at least one electrode of the sensor element with the at least one contact point.

2. The ultrasound sensor according to claim 1, wherein the contact device is formed as a one of an electrically conductive plate and a pressed screen.

3. The ultrasound sensor according to claim 2, wherein the contact device is disk-shaped.

4. The ultrasound sensor according to claim 1, wherein:

the housing jacket defines a shoulder surface formed on an interior side of the housing; and, the contact device is positioned in a direction toward the housing base on said shoulder.

5. The ultrasound sensor according to claim 4, wherein the contact device is fastened to the housing by an attachment element.

6. The ultrasound sensor according to claim 5, wherein:

the contact device includes a first recess;

the shoulder surface includes a second recess; and, the attachment element includes an electrically conductive rivet, the rivet engaging said first recess of the contact device and a second recess in the shoulder surface in a direction parallel to said longitudinal access of the housing.

7. The ultrasound sensor according to claim 4, wherein the contact device includes electrical contact elements extending therefrom.

8. The ultrasound sensor according to claim 7, wherein the contact elements include outwardly oriented contact pins.

9. The ultrasound sensor according to claim 7, wherein:

the housing closure includes a lid mountable on the contact device inside the housing, the lid being fixed against a movement toward the outside of the housing in a direction of the housing longitudinal axis with at least partial regions of the housing jacket being bent over the circumference of the lid towards the center of the housing, the partial regions of the housing jacket acting on the lid with a force in an opposite direction against the contact device to hold the contact device firmly between the partial regions and the shoulder surface.

10. The ultrasound sensor according to claim 9, wherein the partial regions are formed as a circumferential flange.

11. The ultrasound sensor according to claim 10, wherein the contact device includes electrical contact elements extending therefrom; and the lid includes a pair of recesses formed to closely surround the contact elements.

12. The ultrasound sensor according to claim 11, further including a plug receptacle area surrounding the recess outside of the lid.

13. The ultrasound sensor according to claim 12, wherein the plug receptacle area is formed as a connecting piece to an associated external plug.

14. A method for producing an ultrasound sensor comprising the steps of:

a) attaching a sensor element to a housing base on an inside of a housing, b) placing a contact device in an area of the housing opposite the base and c) electrically connecting the contact device and the sensor element through a recess in the contact device using an electrically conductive flexible bond wire.

15. The method according to claim 14, further including the step of forming the contact device as an electrically conductive pressed screen partially surrounded by an electrically non-conductive plastic material.

16. The method according to claim 15, wherein the step of placing the contact device in the area of the housing opposite the base includes the step of mechanically fastening the contact device in a locally fixed fashion within the housing using at least one of an attachment element and by press fitting and connecting the contact device with said housing.

17. The method according to claim 14, further including the step of attaching a lid member onto the housing for providing a housing closure.

18. The method according to claim 17, further including the step of forming a flange in an upper area of the housing jacket by bending over an outer circumference of the housing jacket over the lid member toward the inside of the housing closure to firmly hold the contact element between partial areas of the housing jacket and a shoulder formed in the housing.

19. The method according to claim 18, further including the step of forming a flange on an upper portion of the housing jacket projecting circumferentially above the lid member using a crimping tool to bend edges of the upper portion of the housing jacket inwardly over said lid.

20. The method according to claim 19, further including the step of providing a plug receptacle on said lid for electrical connection of an associated external plug with said contact device.

* * * * *